United States Patent
Tang

(10) Patent No.: US 9,258,739 B2
(45) Date of Patent: Feb. 9, 2016

(54) OFFLOADING METHOD AND DEVICE FOR ENHANCING MOBILITY

(75) Inventor: Delong Tang, Shenzhen (CN)

(73) Assignee: ZTE Corportation, Shenzhen, Guangdong (CN)

(*) Notice: Subject to any disclaimer, the term of this patent is extended or adjusted under 35 U.S.C. 154(b) by 864 days.

(21) Appl. No.: 13/575,955

(22) PCT Filed: Apr. 28, 2011

(86) PCT No.: PCT/CN2011/073464
§ 371 (c)(1),
(2), (4) Date: Jul. 29, 2012

(87) PCT Pub. No.: WO2011/140927
PCT Pub. Date: Nov. 17, 2011

(65) Prior Publication Data
US 2012/0295624 A1 Nov. 22, 2012

(30) Foreign Application Priority Data
May 13, 2010 (CN) .......................... 2010 1 0183166

(51) Int. Cl.
| H04W 72/00 | (2009.01) |
| H04W 36/00 | (2009.01) |
| H04W 28/08 | (2009.01) |
| H04L 29/12 | (2006.01) |
| H04W 36/08 | (2009.01) |
| H04W 76/02 | (2009.01) |
| H04W 84/04 | (2009.01) |

(52) U.S. Cl.
CPC ........... *H04W 28/08* (2013.01); *H04L 61/2514* (2013.01); *H04L 61/2592* (2013.01); *H04W 36/08* (2013.01); *H04W 76/022* (2013.01); *H04W 84/045* (2013.01)

(58) Field of Classification Search
CPC ...... H04W 28/08; H04W 36/22; H04W 48/06
USPC .................................................. 455/453, 436
See application file for complete search history.

(56) References Cited

U.S. PATENT DOCUMENTS

2011/0228750 A1* 9/2011 Tomici et al. ................. 370/338

FOREIGN PATENT DOCUMENTS

| CN | 101207546 A | 6/2008 |
| CN | 101547408 A | 9/2009 |

(Continued)

OTHER PUBLICATIONS

P.R. China, State Intellectual Property Office, International Search Report for International Application No. PCT/CN2011/073464, mailed Aug. 11, 2011.

*Primary Examiner* — Omoniyi Obayanju
(74) *Attorney, Agent, or Firm* — Bright IP Law Offices

(57) ABSTRACT

The present invention provides an offloading method and device for enhancing mobility, used for solving the technical problem of poor mobility in the current offloading and network construction solution. The present invention discloses that: a Network Address Translating (NAT) gateway is deployed in an upper layer of a Femto Node B; a dedicated tunnel for transmitting the offloading data between the Femto Node B and the NAT gateway is established; the NAT translation of the offloading data message is performed by the NAT gateway and the offloading data is forwarded through the dedicated tunnel according to a continuation relationship; when a User Equipment (UE) performs a handover across two Femto Node B's due to mobility, it is only necessary to modify the continuation relationship of the UE, without disconnecting and reconnecting the link of the offloading data stream, thereby improving the system's mobility.

12 Claims, 2 Drawing Sheets

(56) References Cited

FOREIGN PATENT DOCUMENTS

| CN | 101577678 | A | 11/2009 |
| CN | 101646205 | A | 2/2010 |
| WO | 2010017233 | A1 | 2/2010 |

* cited by examiner

OFFLOADING METHOD AND DEVICE FOR ENHANCING MOBILITY

CROSS REFERENCE TO RELATED APPLICATIONS

This application is the U.S. National Stage of International Patent Application No. PCT/CN2011/073464 filed on Apr. 28, 2011, which claims priority to Chinese Patent Application No. 201010183166.3 filed on May 13, 2010. Both the PCT Application and Chinese Application are hereby incorporated by reference in their entirety.

FIELD OF THE INVENTION

The present invention relates to the mobile communication field, and in particular to an offloading method and a device for enhancing mobility in the system that needs to offload the Packet Switched (PS) domain data stream in the Radio Access Network (RAN).

BACKGROUND OF THE INVENTION

In order to alleviate the pressure of the surge in the high-speed data services on high-cost wireless network, mobile operators urgently need effective means to offload the low-value data services from the wireless network as soon as possible.

In the indoor access scene, a typical offloading and network construction solution is as shown in FIG. 1, wherein the structure of this network is based on the flat architecture, the Femto Node B ends the air interface, and for offloading data stream, Network Address Translation (NAT) technology is used to process the data of the Non-Access Stratum (NAS) and then sends it to Gi interface. This solution is mainly used in 2/3Gnetwork, but conditionally restricted in the LTE network.

In this network structure, a Femto Node B is configured with offloading identification mechanism and a Gi interface protocol stack, so that the low-value business data can be identified directly in the Femto Node Band sent to the relatively low-cost fixed network transmission, while the high-value business data can be sent to the traditional wireless network transmission channel in which high-value business data can achieve refined management and service.

The protocol stack model of the offloading data stream is as shown in FIG. 2. This kind of network construction solution can quickly and easily deploy offloading strategy, but the problem is that the mobility is not high. Once the User Equipment (UE) is moved out from the initial accessed Femto Node B, the link of the offloading data stream must be disconnected and then reconnected. The reason is that: a UE is connected to the Internet with the Internet Protocol (IP) address IPue, when the message sent by the UE passes through Femto Node B 1, it will be replaced by the IP address IPnb1 of the Femto Node B 1 by the NAT module, while in fact the IP address linked to the Internet is IPnb1; when the UE moves to another Femto Node B 2, the NAT module of Femto Node B 2 can use the IP address IPnb2 of Femto Node B 2 at this time to replace IPue. Thus, the IP address interacting with the Internet is changed. For the Internet server, the peer IP of the same connection cannot be changed, because the connection is not the same when the peer IP address is changed. Therefore, there is a problem of the poor mobility in the current offloading solution.

SUMMARY OF THE INVENTION

In view of this, the present invention provides an offloading method and device, used for solving the technical problem of the poor mobility in the current offloading and network construction solution.

The technical solution of the present invention is accomplished by:

An offloading method for enhancing mobility, the method comprises:

deploying a Network Address Translation (NAT) gateway in an upper layer of a Femto Node B, establishing a dedicated tunnel for transmitting offloading data between the Femto Node B and the NAT gateway, wherein the Femto Node B and the NAT gateway each maintain a respective continuation relationship of transmitting the offloading data for User Equipment (UE) based on the dedicated tunnel; and the Femto Node B performing the data offloading in a Packet Switched (PS) domain according to an offloading strategy, and forwarding the offloading data through the dedicated tunnel according to the continuation relationship; the NAT gateway performing NAT translation of an offloading data message, and forwarding the offloading data through the dedicated tunnel according to the continuation relationship.

Furthermore, the dedicated tunnel is a fixed dedicated channel established on the basis of a Femto Node B; the continuation relationship maintained by the Femto Node B is: a corresponding relationship among an Internet Protocol (IP) address of the UE, a Radio Access Bearer (RAB) of the UE and a subscriber identity of the UE; the continuation relationship maintained by the NAT gateway is: a corresponding relationship among a NAT item, the subscriber identity of the UE and the dedicated tunnel.

Furthermore, in the case of the fixed dedicated tunnel, when a UE performs a Femto Node B handover due to mobility, a source Femto Node B informs, via the subscriber identity of the UE, the NAT gateway to suspend transmitting a downlink offloading data message of the subscriber identity of the UE; after the UE's access to a target Femto Node B, the target Femto Node B submits the subscriber identity of the UE to the NAT gateway, and the NAT gateway modifies the continuation relationship associated with the UE to the target Femto Node B according to the subscriber identity.

Furthermore, the dedicated tunnel is a temporary dedicated tunnel established for a Radio Access Bear (RAB) of the UE;

The continuation relationship maintained by the Femto Node B is: a corresponding relationship among a subscriber identity of the UE, a dedicated tunnel and the RAB; the continuation relationship maintained by the NAT gateway is: a corresponding relationship among the subscriber identity of the UE, a dedicated tunnel and a NAT item.

Furthermore, in the case of the temporary dedicated tunnel: when a UE performs a Femto Node B handover due to mobility, a source Femto Node B informs, via the subscriber identity of the UE or a tunnel identity list, the NAT gateway to suspend transmitting a downlink offloading data message of the subscriber identity of the UE; after the UE's access to a target Femto Node B, the target Femto Node B establishes a new dedicated tunnel with the NAT gateway, and the NAT gateway modifies the continuation relationship associated with the UE according to the subscriber identity of the UE; after the handover is completed, the source Femto Node B and the NAT gateway delete the dedicated tunnel that has expired.

Furthermore, the subscriber identity is one of an International Mobile Subscriber Identity (IMSI) and a Temporary Mobile Subscriber Identity (TMSI); a tunnel protocol adopted by the dedicated tunnel is: General Packet Radio Service Tunneling Protocol for User Plane (GTPU) protocol, Generic Routing Encapsulation (GRE) protocol, Virtual Private Network (VPN) protocol, or Virtual Local Area Network (VLAN) protocol.

Based on the above method, the present invention further provides an offloading device for enhancing mobility, wherein the device comprises:

a dedicated tunnel management module, configured to establish and maintain a dedicated tunnel for transmitting offloading data between a Femto Node B and a NAT gateway, maintain a continuation relationship of transmitting the offloading data for a UE based on the dedicated tunnel, and perform a function of switching continuation relationships in a handover procedure;

an offloading data processing module, at the Femto Node B, configured to perform the data offloading in a Packet Switched (PS) domain according to an offloading strategy, receive and transmit the offloading data through the dedicated tunnel according to the continuation relationship; and, a NAT module, at the NAT gateway, configured to perform NAT translation of an offloading data message, forward the offloading data through the dedicated tunnel according to the continuation relationship.

Furthermore, the dedicated tunnel established by the dedicated tunnel management module is a fixed dedicated channel;

The continuation relationship relied upon by the offloading data processing module is: a corresponding relationship among an Internet Protocol (IP) address of the UE, a Radio Access Bearer (RAB) of the UE and a subscriber identity of the UE; The continuation relationship relied upon by the NAT module is: a corresponding relationship among a NAT item, the subscriber identity of the UE and the dedicated tunnel.

When a UE performs a Femto Node B handover due to the mobility, the NAT module suspends transmitting a downlink offloading data message of the subscriber identity of the UE; after the UE's access to a target Femto Node B, the dedicated tunnel management module modifies the continuation relationship of the UE to the target Femto Node B according to the subscriber identity.

Furthermore, the dedicated tunnel established by the dedicated tunnel management module is a temporary dedicated tunnel established for a Radio Access Bearer (RAB) of the UE.

The continuation relationship relied upon by the offloading data processing module is: a corresponding relationship among a subscriber identity of the UE, a dedicated tunnel and the RAB; the continuation relationship relied upon by the NAT module is: a corresponding relationship among a NAT item, the subscriber identity of the UE and the dedicated tunnel.

When a UE performs a Femto Node B handover due to the mobility, the NAT module suspends transmitting a downlink offloading data message of the subscriber identity of the UE or tunnel identifying list; after the UE's access to the target Femto Node B, the dedicated tunnel management module establishes a new dedicated tunnel for the UE, modifies the corresponding continuation relationship according to the subscriber identity of the UE, and deletes the dedicated tunnel that has expired after the handover is completed.

In the present invention, a NAT gateway is deployed in an upper layer of a Femto Node B, a dedicated tunnel for transmitting the offloading data between the Femto Node B and the NAT gateway is established. The NAT translation of the offloading data message is performed by the NAT gateway and the offloading data are forwarded through the dedicated tunnel according to a continuation relationship. When a UE performs a Femto Node B handover due to mobility, it is only necessary to modify the continuation relationship of the UE, without disconnecting and reconnecting the link of the offloading data stream, thereby improving the system's mobility.

DETAILED DESCRIPTION OF THE EMBODIMENTS

In order to make the purpose, the technical solution and the advantages of the present invention clearer, the present invention will be further illustrated hereinafter in conjunction with the exemplary embodiments and accompanying drawings.

Figure 1:
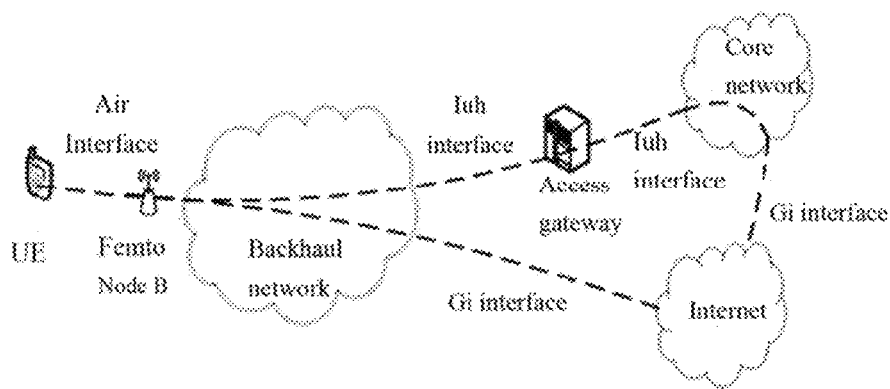
FIG. 1 is an offloading network construction solution using the conventional technology.
Figure 2:
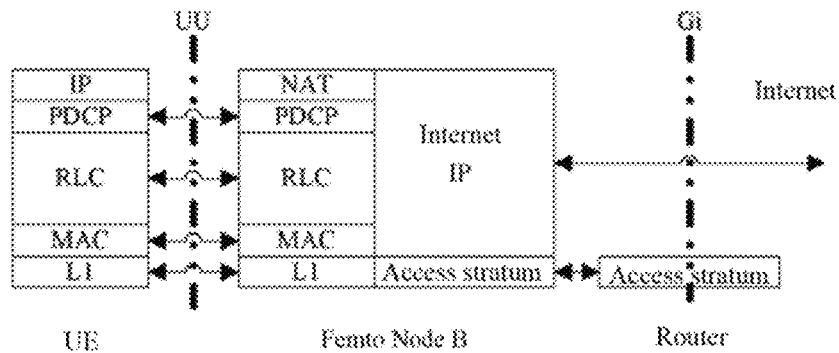
FIG. 2 is a protocol stack model of the offloading data stream.
Figure 3:
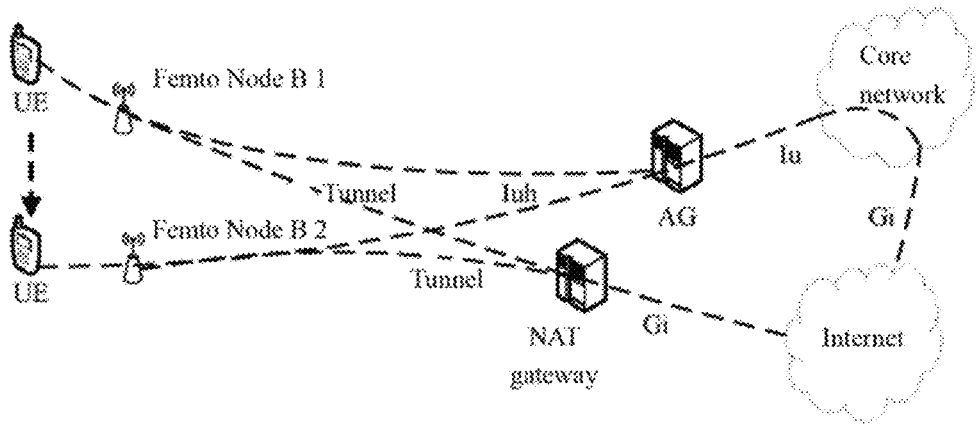
FIG. 3 is an offloading network construction solution disclosed in the present invention.
Figure 4:
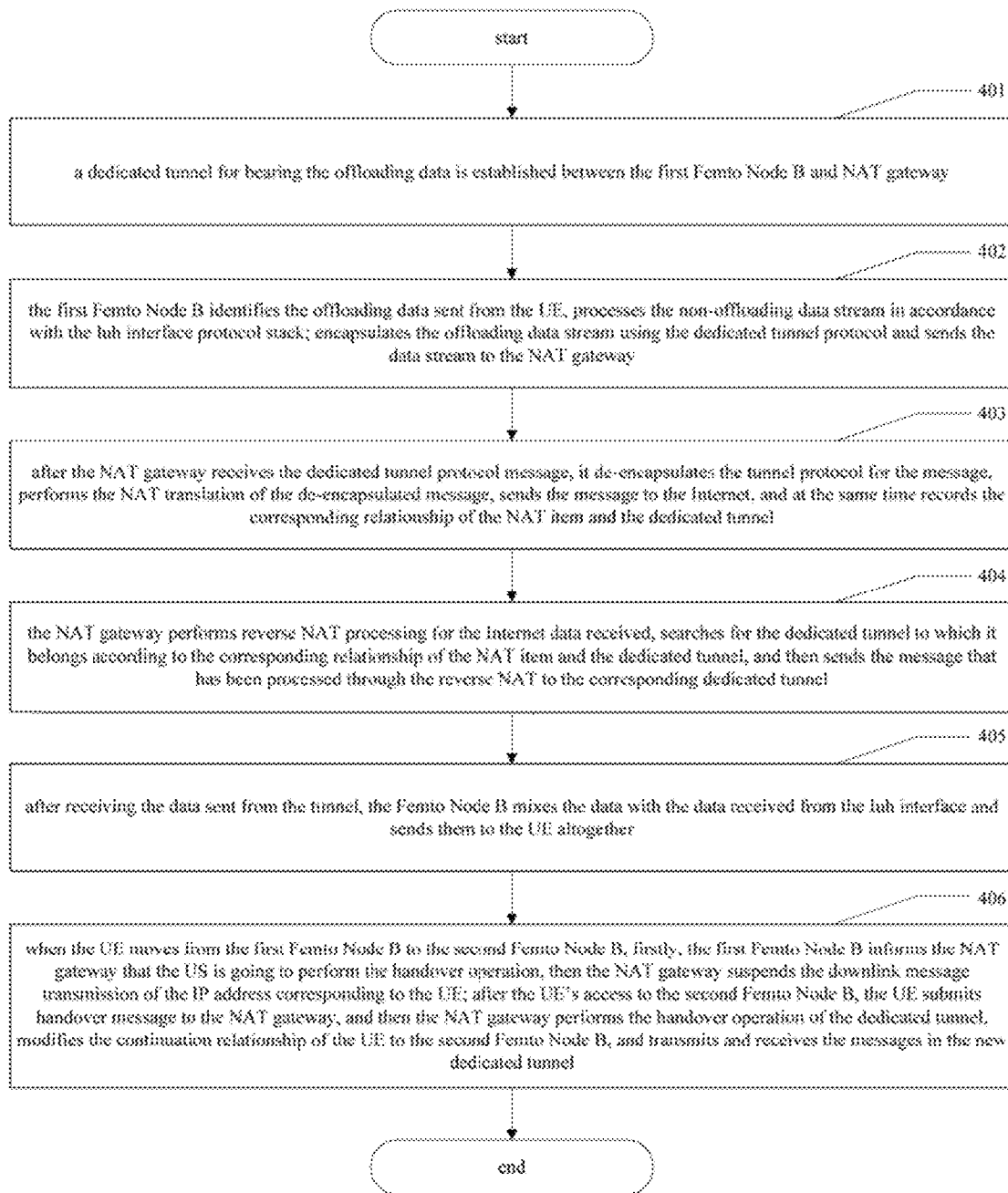
FIG. 4 is a flow chart of an offloading method for enhancing mobility provided by the present invention.

FIG. 4 is a flow chart of the offloading method for enhancing mobility provided by the present invention. The method is based on the offloading network structure as shown in FIG. 3. The present invention discloses that: a NAT gateway is deployed between the Femto Node B and the Internet, one NAT gateway can connect with multiple Femto Nodes B's, and a dedicated tunnel is established between the Femto Node B and NAT gateway used to bear the offloading data; when the UE moves, the UE mobility management is implemented through the dedicated tunnel handover, the introduction of the NAT gateway that performs the network address mapping, for the Internet, shields the technical defects that network address is changed due to the Femto Node 13 handover of the UE, wherein, when the UE moves, there is no need for disconnecting and reconnecting the link of the offloading data stream, thereby improving the system's mobility.

The offloading method for enhancing mobility provided by the present invention includes the following steps:

Step S401: a dedicated tunnel for bearing the offloading data is established between a first Femto Node B and NAT gateway, used for transferring the offloading data stream.

Preferably, the dedicated tunnel can be a fixed dedicated tunnel established by the Femto Node B or a temporary dedicated tunnel established for RAB of the UE.

In the mode of the temporary dedicated tunnel, a dedicated tunnel between the Femto Node B and the NAT gateway is established for every UE or RAB of the UE, used to transferring offloading data stream of each UE.

In the mode of the fixed dedicated tunnel, a dedicated tunnel between the Femto Node B and the NAT gateway is established for each Femto Node B, used to transfer offloading data stream of all UE in this Femto Node B, and the different UEs in the same Femto Node B are identified with different service layer IP addresses.

The tunnel protocol adopted by the dedicated tunnel is required such that it can identify different Femto Node B's and even different UEs in the same Femto Node B according to certain feature of this protocol. The tunnel protocol can be: GTPU protocol, GRE protocol, VPN protocol or VLAN protocol and so on.

Step 402: the first Femto Node B identifies the offloading data sent from the UE, processes the non-offloading data stream in accordance with the Iuh interface protocol stack; encapsulates the offloading data stream using the dedicated tunnel protocol and sends the data stream to the NAT gateway.

Step 403: after the NAT gateway receives the dedicated tunnel protocol message, it de-encapsulates the tunnel protocol for the message, performs the NAT translation of the dc-encapsulated message, sends the message to the Internet, and at the same time records the corresponding relationship of the NAT item and the dedicated tunnel;

The NAT item contains the corresponding relationship of the IP/port address & the protocol type of the application data stream UE which is connected with the Ethernet and the IP/port address & the protocol type exposed to the Internet.

Step 404: the NAT gateway performs reverse NAT processing for the Internet data received, searches for the dedicated tunnel to which it belongs according to the corresponding relationship of the NAT item and the dedicated tunnel, and then sends the message that has been processed through the reverse NAT to the corresponding dedicated tunnel.

Step 405: after receiving the data sent from the tunnel, the Femto Node B mixes the data with the data received from the 1 μl interface and sends them to the UE altogether.

Step 406: when the UE moves from the first Femto Node B to the second Femto Node B, firstly, the first Femto Node B informs the NAT gateway that the US is going to perform the handover operation, then the NAT gateway suspends the downlink message transmission of the IP address corresponding to the UE; after the UE's access to the second Femto Node B, the UE submits handover message to the NAT gateway, and then the NAT gateway performs the handover operation of the dedicated tunnel, modifies the continuation relationship of the UE to the second Femto Node B, and transmits and receives the messages in the new dedicated tunnel;

Embodiment 1

Step 501: the NAT gateway is deployed in the upper layer of the Femto Node B, managing multiple Femto Nodes B's in a certain area; the dedicated VPN tunnel is established to transfer offloading data between the NAT gateway and the Femto Node B when they are powered up.

Step 502: the Femto Node B is pre-configured with offloading strategies, the configuration strategy can be different depending on specific operating scenes; it can be the combination of one or more of the offloading strategies:

(a) for certain UE, when the UE initiates a request for surfing the internet, if the core network clearly identifies that the corresponding data stream cannot be offloaded for the UE through Radio Access Network Application Part (RANAP) message then the Femto Node B will not perform offloading processing for this UE;

(b) if offloading processing can be performed for the UE, furthermore, if its Access Point Name (APN) is a certain one in the context of the Packet Data Protocol (PDP), then the offloading processing cannot be performed for all the data streams of the corresponding PDP of the UE, otherwise the offloading processing can be performed;

(c) if offloading processing can be performed for the UE, furthermore, if the Allocation/Retention Priority (ARP) of the UE's Radio Access Bearer (RAB) is greater than the preset threshold 1, for example greater than 10, then the offloading processing is performed for all the data streams of the RAB; if ARP is less than the preset threshold 1 and greater than preset threshold 2, for example less than threshold 10 and greater than threshold 5, then the offloading processing is performed for part of all the data streams of the RAB; if ARP is less than the preset threshold 2, then no offloading processing is performed;

(d) if offloading processing can be performed for the UE, furthermore, the IP packet of the UE's RAB is analyzed; if it belongs to data of Hypertext Transfer Protocol (HTTP), it cannot be offloaded, if it belongs to service of peer to peer (P2P), it must be offloaded;

Step 503: upon the UE's access to NB1, NB1 monitors the NAS of the UE and the message of the Access Stratum (AS) to determine whether the PS data of the UE can be offloaded and determine the offloading feature, and record the unique identity of the UE which can be IMSI (International Mobile Subscriber Identity) or TMSI (Temporary Mobile Subscriber Identity).

Step 504: the continuation relationship of the UE is established between the NB1 and NAT gateway according to IMSI/TMSI, the continuation relationship includes: a corresponding relationship among the UE's IP address maintained by NB1,UE's Radio Access Bearer (UE RAB) and UE's identity (UE IMSI/TMSI); a corresponding relationship among the UE's IP address (UE IP) together with the protocol type and the port number maintained by the NAT gateway, the IP address together with the protocol type and the port number which are exposed to the Internet by the NAT gateway of the corresponding UE data stream, UE identity (IMSI/TMSI) and the special tunnel (NB1 VPN).

Step 505: the UE performs data exchange with the Internet through NB1, wherein in the uplink direction, NB1 analyses the data stream of the UE, and determines whether the data stream needs offloading processing according to the offloading strategy.

Step 506: NB1 records the corresponding relationship between the source IP address of the offloading data and the UERAB, and then sends the offloading data to the VPN tunnel between the NAT gateway and the NB1.

Step 507: the NAT gateway receives the data from the VPN tunnel, performs NAT processing for IF messages, records the corresponding relationship between the NAT item and the dedicated VPN tunnel, and sends data after being processed by the NAT to the Internet.

Step 508: when the Internet sends data to the UE, the NAT gateway performs reverse NAT processing according to the corresponding relationship between the NAT item and the dedicated VPN tunnel, and then sends the data processed to the VPN tunnel of the corresponding NB1;

Step 509: when the downlink message reaches to NB1, NB1 analyzes the destination IP address of the message, finds the corresponding RAB belonging to the UE, and sends the message to the corresponding RAB of the user;

Step 510: when the UE performs handover to the Femto Node B 2 (NB2), NB1 first informs the NAT gateway that UE requires handover to NB2, then the NAT gateway suspends the downlink message transmission to the IP address of the corresponding UE IMSI/TMSI;

Step 511: after the UE's access to NB2 (the related access processes are the same as that of NB1),NB2 submits the UE subscriber identity (IMSI/TMSI) information to the NAT gateway; the NAT gateway, after receiving the UE subscriber identity, first searches to determine whether there is the continuation relationship of the same UE; if there is, the NAT gateway modifies the continuation relationship of the UE to NB2, continues receiving and transmitting the message in new tunnel; if not, then the NAT gateway establishes a new continuation relationship.

Embodiment 2 (Referring to the Previous Embodiment, this Embodiment Mainly Describes the Differences Between this Embodiment and the Above Embodiment)

This embodiment performs PS domain data stream offloading processing by establishing dedicated tunnel for the UE, what is different from Embodiment 1 is that the dedicated tunnel established in Embodiment 1 is a fixed dedicated tunnel established for the Femto Node B that exists indefinitely once established by the Femto Node B and will not be removed due to the UE's handover between the Femto Node B's, while the dedicated tunnel established in this embodiment is a temporary dedicated tunnel established for RAB of the UE, which means the dedicated tunnel in the source Femto Node B should be removed and a new dedicated tunnel should be established in the goal Femto Node Bin case of the Femto Node B handover due to the mobility.

Step 601: the NAT gateway is deployed in the upper layer of a Femto Node B, managing multiple Femto Nodes B's in a certain area. The NAT gateway keeps mutual-communication with the Femto Node B, but there is no tunnel established in advance.

Step 602: the Femto Node B is pre-configured with offloading strategy, the configured strategy can be different depending on specific operating scene.

Step 603: upon the UE's access to NB1, if NB1 determines that certain RAB of UE1 might require offloading processing, NB1 then establishes GTPU dedicated tunnel with the NAT gateway. One user can have several tunnels corresponding to several RABs and users are identified according to the subscriber identity;

NB1 maintains the corresponding relationship between the GTPU dedicated tunnel and the RAB, NAT gateway maintains the corresponding relationship between the subscriber identity and the GTPU dedicated tunnel; and the subscriber identity can be but not limited to IMSI or TMSI;

Step 604: after receiving the uplink data stream sent by the UE, NB1 identifies whether the data have been offloaded; perform Iuh encapsulation for the non-offloaded data, and perform GTPU encapsulation for the offloaded data stream;

Step 605: after receiving the uplink GTPU data, the NAT gateway de-encapsulates them, performs NAT processing, and records the corresponding relationship between the NAT item and the GTPU dedicated tunnel of the message.

Step 606: when the Internet sends data to the UE, the NAT gateway performs reverse NAT processing according to the recorded corresponding relationship between the NAT item and the GTPU dedicated tunnel, and performs the corresponding GTPU encapsulation;

Step 607: after receiving de-GTPU encapsulation message, NB1 sends the message and the non-offloading message to the corresponding air interface of the UE according to the corresponding relationship between the GTPU dedicated tunnel and RAB;

Step 608: when the UE moves to NB2, NB1 informs the NAT gateway that the UE is performing handover according to the subscriber identity or the tunnel identifier list, the NAT gateway suspends the downlink data transmission of the GTPU tunnel of the corresponding subscriber identity or the tunnel identifier list;

Step 609: after the UE's access to NB2, a new GTPU dedicated tunnel for UERAB is established between NB2 and the NAT gateway where the NAT gateway continues receiving and transmitting data after modifying the continuation relationship of the UE according to the subscriber identity of the UE, Step 610: after the UE completes the handover, the expired GTPU tunnel is deleted from NB1 and NAT gateway.

Figure 5:
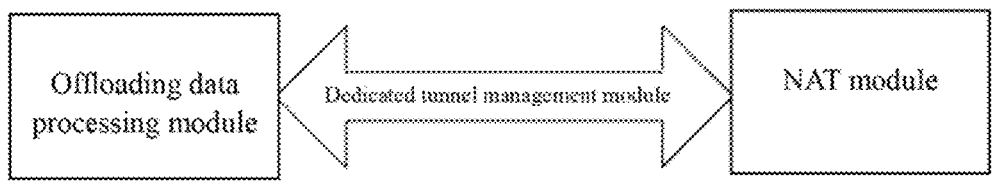
FIG. 5 is a schematic view of the structure of an offloading device for enhancing mobility provided by the present invention.

FIG. 5 is an offloading device for enhancing mobility provided by the present invention, the device includes: an offloading data processing module, a NAT module, and a dedicated tunnel Management module;

The offloading data processing module is deployed inside the Femto Node B, the NAT module is deployed inside the NAT Gateway (NAT GW) at the upper layer of the Femto Node B, while the dedicated tunnel management module exists at both the Femto Node B and the NAT gateway, used to perform tunnel deletion, tunnel establishing and the Femto Node B handover between the Femto Node B and the NAT gateway.

The dedicated tunnel management module, used to maintain (establish/delete/modify) the dedicated tunnel between the Femto Node B and the NAT gateway of the corresponding UE, maintain the continuation relationship of transferring the UE offloading data based on the dedicated tunnel; and be responsible for the handover of the dedicated tunnel when the UE moves.

The offloading data processing module, used to monitor the AS message and NAS message of the user in the Femto Node B, analyze users' data streams, perform offloading processing of the PS domain data according to the offloading strategy, and receive and transmit the offloading data through the dedicated tunnel according to the continuation relationship.

The NAT module, used to perform NAT transferring of the offloading data message, forward the offloading data through the dedicated tunnel according the continuation relationship.

In the direction of the uplink, the IP message that the UE transfers to the NAT module through the Femto Node B is encapsulated in certain dedicated tunnel, the NAT module records corresponding relationship between the dedicated tunnel and the address of the IP message together with the port, replaces the source address port of the IP message with the IP address port of the Gi interface managed by the NAT gateway, sends the message to Gi interface; in the direction of downlink, the NAT module performs reverse NAT processing for the message received by Gi interface and sends the message processed to the corresponding dedicated tunnel.

In the case of the fixed dedicated tunnel, the continuation relationship relied upon by the offloading data processing module is: the corresponding relationship among the UE IP address, UE RAB and the subscriber identity of the UE; the continuation relationship relied upon by the NAT module is: a corresponding relationship among a NAT item, the subscriber identity of the UE and the dedicated tunnel. When the UE performs the Femto Node B-crossing handover due to the mobility, said the NAT module suspends the downlink offloading data message transmission corresponding to the subscriber identity of the UE; after the UE's access to the goal Femto Node B, the dedicated tunnel management module modifies the continuation relationship of the UE to the goal Femto Node B according to the subscriber identity.

In the scheme of using the temporary dedicated tunnel of the RAB of the UE, the continuation relationship relied upon by the offloading data processing module is: a corresponding relationship among the EU subscriber identity, dedicated tunnel and RAB; the continuation relationship relied upon by the NAT module is: a corresponding relationship among NAT item, subscriber identity of the UE and dedicated tunnel; when the UE performs the Femto Node B-crossing handover due to mobility, the NAT module suspends the downlink offloading data message transmission corresponding to the subscriber identity of the UE; after the UE's access to the goal Femto Node B, the dedicated tunnel management module establishes a new tunnel for the UE, modifies the continuation relationship according to the subscriber identity of the UE, and deletes the expired dedicated tunnel when the Femto Node B handover is complete.

The description above is just the preferred embodiments of the present invention, not intended to limit the protection scope of the present invention.

INDUSTRIAL APPLICABILITY

The present invention discloses that: a Network Address Translating gateway is deployed in the upper layer of a Femto Node B; a dedicated tunnel for transmitting the offloading data between the Femto Node B and the NAT gateway is established; the NAT translation of the offloading data message is performed by the NAT gateway and the offloading data are forwarded through the dedicated tunnel according to a continuation relationship; when the UE performs a handover across two Femto Node B's due to mobility, the continuation relationship of the UE is needed to be modified, without the link disconnection and reconnection of the offloading data stream; the present invention solves the technical problem of the poor mobility in the current offloading and network construction solution, so that the mobility of the system is improved.

The invention claimed is:

1. An offloading method for enhancing mobility, comprising:
    deploying a Network Address Translation (NAT) gateway in an upper layer of a Femto Node B, establishing a dedicated tunnel for transmitting offloading data between the Femto Node B and the NAT gateway, wherein the Femto Node B and the NAT gateway each maintain a respective continuation relationship of transmitting the offloading data for User Equipment (UE) based on the dedicated tunnel; and
    the Femto Node B performing the data offloading in a Packet Switched (PS) domain according to an offloading strategy, and forwarding the offloading data through the dedicated tunnel according to the continuation relationship; the NAT gateway performing NAT translation of an offloading data message, and forwarding the offloading data through the dedicated tunnel according to the continuation relationship; wherein,
    the dedicated tunnel is a fixed dedicated channel established on the basis of a Femto Node B;
    the continuation relationship maintained by the Femto Node B is: a corresponding relationship among an Internet Protocol (IP) address of the UE, a Radio Access Bearer (RAB) of the UE and a subscriber identity of the UE; and
    the continuation relationship maintained by the NAT gateway is: a corresponding relationship among a NAT item, the subscriber identity of the UE and the dedicated tunnel;
    wherein the method further comprises:
    when a UE performs a Femto Node B handover due to mobility, a source Femto Node B informing, via the subscriber identity of the UE, the NAT gateway to suspend transmitting a downlink offloading data message of the subscriber identity of the UE; and
    after the UE's access to a target Femto Node B, the target Femto Node B submitting the subscriber identity of the UE to the NAT gateway, and the NAT gateway modifying the continuation relationship associated with the UE to the target Femto Node B according to the subscriber identity.

2. The method as claimed in claim 1, wherein,
    the dedicated tunnel is a temporary dedicated tunnel established for a Radio Access Bearer (RAB) of the UE;
    the continuation relationship maintained by the Femto Node B is: a corresponding relationship among a subscriber identity of the UE, a dedicated tunnel and the RAB; and
    the continuation relationship maintained by the NAT gateway is: a corresponding relationship among the subscriber identity of the UE, a dedicated tunnel and a NAT item.

3. The method as claimed in claim 2, wherein the method further comprises:
    when a UE performs a Femto Node B handover due to mobility, a source Femto Node B informing, via the subscriber identity of the UE or a tunnel identity list, the NAT gateway to suspend transmitting a downlink offloading data message of the subscriber identity of the UE;
    after the UE's access to a target Femto Node B, the target Femto Node B establishing a new dedicated tunnel with the NAT gateway, and the NAT gateway modifying the continuation relationship associated with the UE according to the subscriber identity of the UE; and
    after the handover is completed, the source Femto Node B and the NAT gateway deleting the dedicated tunnel that has expired.

4. The method as claimed in claim 1, wherein the subscriber identity is one of an International Mobile Subscriber Identity (IMSI) and a Temporary Mobile Subscriber Identity (TMSI); and
    a tunnel protocol adopted by the dedicated tunnel is: General Packet Radio Service Tunneling Protocol for User Plane (GTPU) protocol, Generic Routing Encapsulation (GRE) protocol, Virtual Private Network (VPN) protocol, or Virtual Local Area Network (VLAN) protocol.

5. An offloading device for enhancing mobility, comprising:
    a dedicated tunnel management module, configured to establish and maintain a dedicated tunnel for transmitting offloading data between a Femto Node B and a NAT gateway, maintain a continuation relationship of transmitting the offloading data for a UE based on the dedicated tunnel, and perform a function of switching continuation relationships in a handover procedure;
    an offloading data processing module, at the Femto Node B, configured to perform the data offloading in a Packet Switched (PS) domain according to an offloading strategy, receive and transmit the offloading data through the dedicated tunnel according to the continuation relationship; and
    a NAT module, at the NAT gateway, configured to perform NAT translation of an offloading data message, forward the offloading data through the dedicated tunnel according to the continuation relationship; wherein,
    the dedicated tunnel established by the dedicated tunnel management module is a fixed dedicated channel;
    the continuation relationship relied upon by the offloading data processing module is: a corresponding relationship among an Internet Protocol (IP) address of the UE, a Radio Access Bearer (RAB) of the UE and a subscriber identity of the UE; and the continuation relationship relied upon by the NAT module is: a corresponding relationship among a NAT item, the subscriber identity of the UE and the dedicated tunnel;

wherein, when a UE performs a Femto Node B handover due to mobility, the NAT module suspends transmitting a downlink offloading data message of the subscriber identity of the UE; and after the UE's access to a target Femto Node B, the dedicated tunnel management module modifies the continuation relationship of the UE to the target Femto Node B according to the subscriber identity.

6. The device as claimed in claim 5, wherein, the dedicated tunnel established by the dedicated tunnel management module is a temporary dedicated tunnel established for a Radio Access Bearer (RAB) of the UE;

the continuation relationship relied upon by the offloading data processing module is: a corresponding relationship among a subscriber identity of the UE, a dedicated tunnel and the RAB; and the continuation relationship relied upon by the NAT module is: a corresponding relationship among a NAT item, the subscriber identity of the UE and the dedicated tunnel.

7. The device as claimed in claim 6, wherein, when a UE performs a Femto Node B handover due to mobility, the NAT module suspends transmitting a downlink offloading data message of the subscriber identity of the UE or a tunnel identifying list;

after the UE's access to the target Femto Node B, the dedicated tunnel management module establishes a new dedicated tunnel for the UE, modifies the corresponding continuation relationship according to the subscriber identity of the UE, and deletes the dedicated tunnel that has expired after the handover is completed.

8. The device as claimed in claim 5, wherein the subscriber identity is one of an International Mobile Subscriber Identity (IMSI) and a Temporary Mobile Subscriber Identity (TMSI); and a tunnel protocol adopted by the dedicated tunnel is: GTPU protocol, GRE protocol, VPN protocol, or VLAN protocol.

9. The method as claimed in claim 2, wherein the subscriber identity is one of an International Mobile Subscriber Identity (IMSI) and a Temporary Mobile Subscriber Identity (TMSI); and a tunnel protocol adopted by the dedicated tunnel is: General Packet Radio Service Tunneling Protocol for User Plane (GTPU) protocol, Generic Routing Encapsulation (GRE) protocol, Virtual Private Network (VPN) protocol, or Virtual Local Area Network (VLAN) protocol.

10. The method as claimed in claim 3, wherein the subscriber identity is one of an International Mobile Subscriber Identity (IMSI) and a Temporary Mobile Subscriber Identity (TMSI); and a tunnel protocol adopted by the dedicated tunnel is: General Packet Radio Service Tunneling Protocol for User Plane (GTPU) protocol, Generic Routing Encapsulation (GRE) protocol, Virtual Private Network (VPN) protocol, or Virtual Local Area Network (VLAN) protocol.

11. The device as claimed in claim 6, wherein the subscriber identity is one of an International Mobile Subscriber Identity (IMSI) and a Temporary Mobile Subscriber Identity (TMSI); and a tunnel protocol adopted by the dedicated tunnel is: GTPU protocol, GRE protocol, VPN protocol, or VLAN protocol.

12. The device as claimed in claim 7, wherein the subscriber identity is one of an International Mobile Subscriber Identity (IMSI) and a Temporary Mobile Subscriber Identity (TMSI); and a tunnel protocol adopted by the dedicated tunnel is: GTPU protocol, GRE protocol, VPN protocol, or VLAN protocol.

* * * * *